Sept. 17, 1935.  A. RENSHAW  2,014,984

TENSIONING DEVICE FOR CHAINS, BELTS AND THE LIKE

Filed Nov. 7, 1934  2 Sheets-Sheet 1

INVENTOR
Alfred Renshaw,
BY
[signature]
ATTORNEY

Sept. 17, 1935.  A. RENSHAW  2,014,984
TENSIONING DEVICE FOR CHAINS, BELTS AND THE LIKE
Filed Nov. 7, 1934    2 Sheets-Sheet 2

INVENTOR
Alfred Renshaw
BY
ATTORNEY

Patented Sept. 17, 1935

2,014,984

UNITED STATES PATENT OFFICE 2,014,984

TENSIONING DEVICE FOR CHAINS, BELTS, AND THE LIKE

Alfred Renshaw, Manchester, England, assignor to The Renold and Coventry Chain Company Limited, Didsbury, Manchester, England, a company of Great Britain Application November 7, 1934, Serial No. 751,919
In Great Britain November 29, 1933

3 Claims. (Cl. 74—242.11)

This invention relates to automatic tensioning devices for driving chains, belts or like flexible members of the kind which are fitted with non-return mechanisms in the nature of one-directional clutches which, while allowing a jockey wheel to be constantly urged into engagement with the chain or belt by means of a spring, resist motion away from the chain or belt. The object of the invention is to provide a tensioning device of this kind which will be less costly and more efficient in operation than those hitherto used.

According to the present invention the jockey wheel is in the form of a sleeve which is mounted to rotate upon a cylindrical bearing block which itself is pivotally mounted about a bearing pin extending through it near its periphery and supported at both ends in a supporting member, there being a ratchet or like device which permits the bearing block to swing about the bearing pin in one direction but normally not in the other. The supporting member comprises a back-plate to which is secured a spigot which extends through a clearance aperture in the bearing block, and a front-plate which is secured detachably to the free end of the spigot, the bearing pin being held in holes in the two plates. Alternatively, the spigot may be integral with the back-plate.

Preferably the one-way clutch device comprises ratchet teeth formed in an arcuate portion of the spigot, which arcuate portion is concentric with the bearing pin, together with a pawl housed in a recess in the bearing block and spring-pressed into engagement with the ratchet teeth. Instead of a single pawl there may be two or more pawls mounted side by side and having their teeth-engaging faces spaced apart a distance equal to half the pitch of the ratchet teeth, when there are two pawls, or one-third when there are three, and so on. Thus, a vernier effect is secured in that the maximum backward movement of the bearing block about the bearing pin is a fraction of the pitch of the teeth instead of being equal to the whole pitch as is the case when one pawl is employed.

Figure 1:
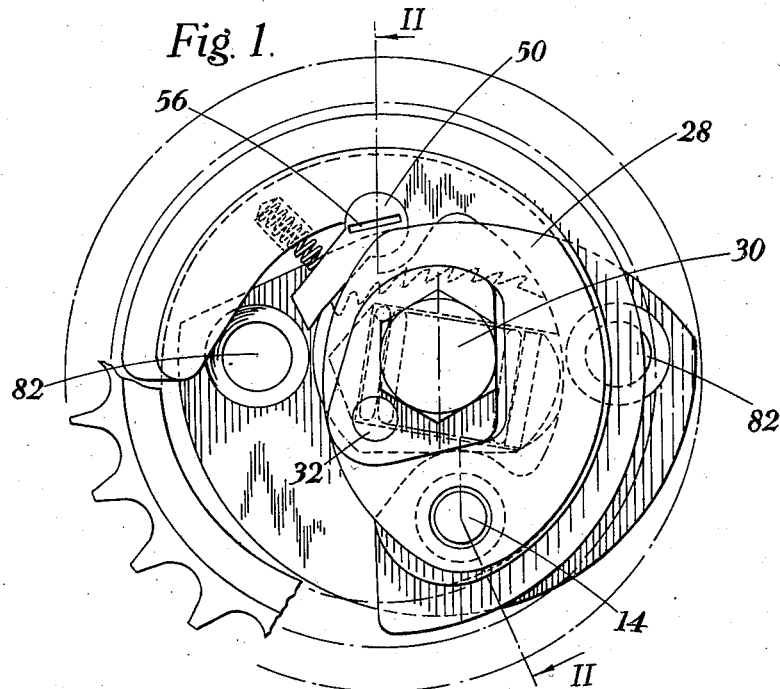
Figure 2:
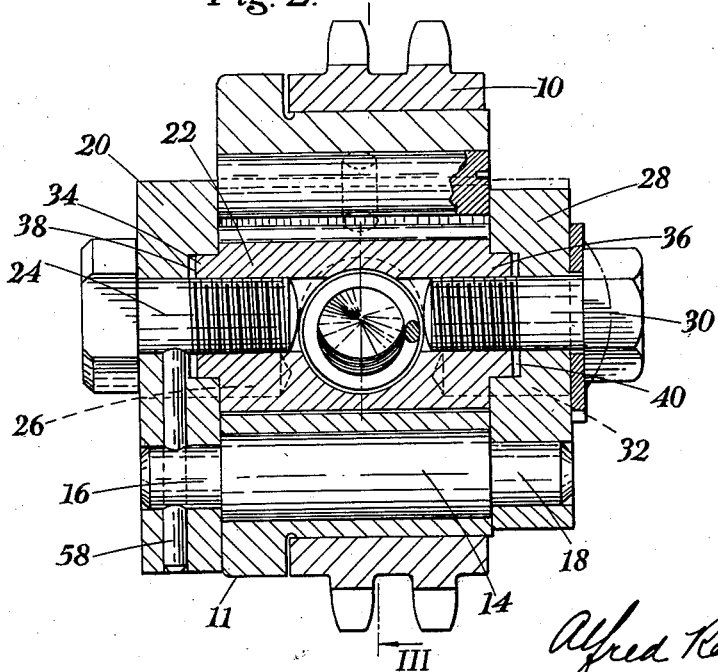
Figure 3:
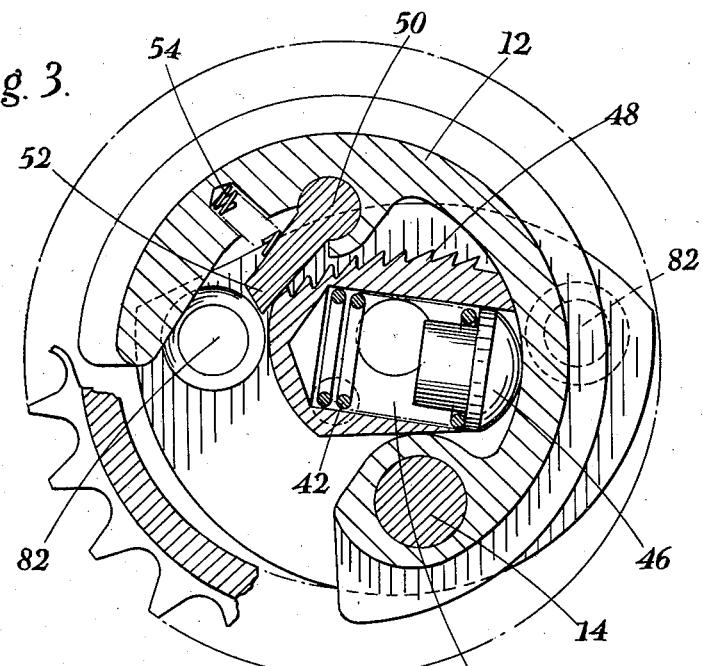
Figure 4:
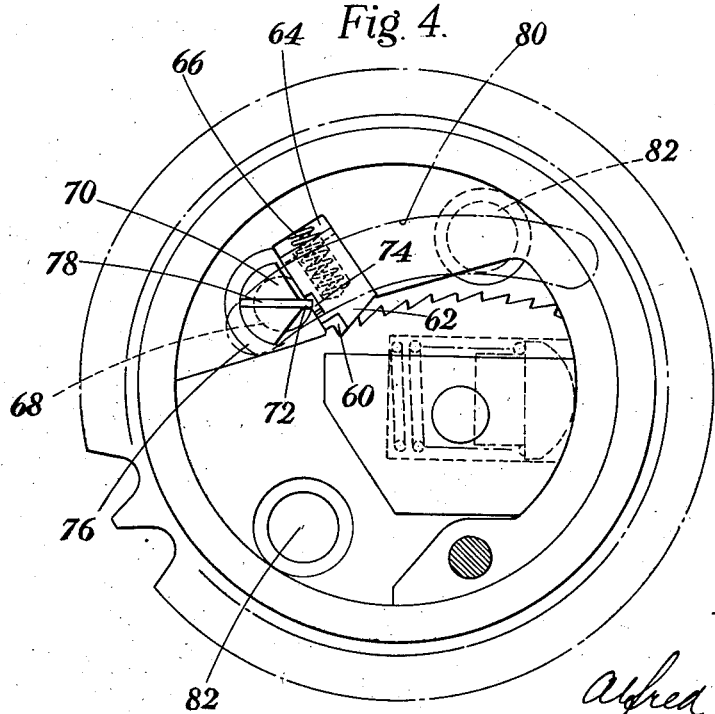

A preferred construction of a chain tensioner according to this invention is illustrated in the accompanying drawings, in which Figure 1 is a front elevation of the tensioner with part of the sprocket wheel removed, Figure 2 is a side elevation in section along the line II—II in Figure 1, Figure 3 is an elevation in section along the line III—III in Figure 2, and Figure 4 is a fragmentary view showing a modified construction of the pawl mechanism.

A sleeve 10 formed with sprocket teeth, here shown in two rows for a duplex chain, rotates upon a cylindrical bearing block 12 mounted to swing on a bearing pin 14 which extends through a hole near the periphery of the block. This bearing pin has ends 16, 18 of reduced diameter for location in the back-plate and front-plate respectively. The back-plate 20 is secured to a spigot 22 by means of a screw 24 and a dowel 26, and the bearing block has a wide aperture clearly shown in Figure 3 to accommodate the spigot. The front-plate 28 is secured to the front end of the spigot by a screw 30 and a dowel 32. The ends of the spigot are formed with cylindrical projections 34, 36 which fit cylindrical recesses 38, 40 in the back-plate and the front-plate respectively. The bearing block 12 is an easy fit between the plates 20, 28. The sleeve 10 is kept in lateral position by the normal resistance to side movement of the chain when gearing with the teeth, the shoulder 11 on the bearing block limiting the rearward movement. The shape of the front-plate 28 permits of the sleeve being withdrawn from or assembled on the bearing block 12.

The aperture in the bearing block 12 breaks through the side of the block so that, as seen clearly in Figures 1 and 3, the block is somewhat U shaped. Thus it will be seen that the bearing block and the jockey wheel surrounding it can swing about the pin 14 through a considerable angle in relation to the supporting member. A coil spring 42 housed in a recess 44 in the spigot 22 presses against a plunger 46 which in turn presses against the side of the aperture in the bearing block opposite to the open or cut away side so that the bearing block is urged to swing clockwise as seen in Figures 1 and 3, the device being, of course, so mounted that the movement in this direction tightens the chain. The parts are shown in the position that they occupy when the chain is at its maximum or initial tension, the spring 42 being compressed to its maximum extent.

The upper side of the spigot 22 is shaped as an arc of a circle concentric with the bearing pin 14 and is fored with ratchet teeth 48. A cylindrical pin 50 is housed in a cylindrical recess in the side of the aperture in the bearing block 12 and this pin 50 is formed with an integral extension 52 constituting a pawl, which is pressed into engagement with the ratchet teeth 48 by a coil spring 54. The front end of the pin 50 is formed with a slot 56 into which a screw-driver can be inserted to swing the pawl out of engagement with the ratchet teeth when it is desired to reset the device.

A locking pin 58 is inserted into a hole which extends through the end 16 of the bearing pin 14 and into the screw 24. After this pin has been inserted the edges of the mouth of the hole in the back-plate 20 are peened over to retain the pin. Thus, the screw 24, the spigot 22 and the pin 14 are locked permanently to the back-plate 20. The dowel 26 cannot of course be removed because its end is covered by the head of the screw 24 and therefore all these parts form one single unit.

Referring now to Figure 4 in which a modified pawl mechanism is shown, there are two pawls 60, 62 mounted side by side in a rectilinear slot 64 in the bearing block 12 each of which is urged into engagement with the ratchet teeth 48 by a coil spring 66. The noses of the two pawls are displaced from one another in the direction of travel of the bearing block by a distance equal to one half the pitch of the teeth 48 as clearly shown in the drawings. Thus, one or other of the pawls must engage a tooth when the bearing block moves in relation to the spigot by an amount equal to half the pitch of the tooth. A cylindrical recess 68 is formed in the bearing block which breaks into the slot 64 in which the pawls slide, and in this cylindrical recess is housed a pin 70 having a projection 72 which engages in notches 74 made in the sides of the pawls. Thus the pawls can be withdrawn from the ratchet teeth by turning the pin 70 in the anticlockwise direction. The front end of the pin is formed with a head 76 having a slot 78 for the insertion of a screwdriver.

In this construction the front plate 28 is a disc of the same diameter as the sleeve 10 and it is provided with an arcuate slot indicated in dotted lines at 80 through which the screw-driver can be inserted. This slot is of such a length that the pin 70 can be actuated in all positions of the bearing block. The width of the slot is less than the diameter of the slot 76 from the pin so that the front plate retains the pin in position. In a similar manner the edge of the front plate 28 shown in Figure 1 retains the pawl 50 in position.

There may be more than two pawls 60 having their noses spaced apart by fractions of the tooth pitch equal to the reciprocal of the number of pawls, whereby the individual steps of movement of the bearing block are made still smaller.

In both constructions the back-plate is provided with two counter-holes 82 for the reception of bolts or screws used in securing the tensioner to a fixed support.

It will be appreciated that the tensioning device constructed in this manner can be manufactured very cheaply and that its assembly is very simple since all the parts are retained in place by the front-plate which is secured by a single screw. It will also be appreciated that the friction attendant on the operation of this device is much less than is the case when the moving part is guided to move in a straight line. Yet another advantage is that the pawl is symmetrically disposed in relation to the plane of the chain so that there are no tilting or rocking stresses set up by the reaction of the chain.

I claim:—

1. An automatic tensioning device comprising in combination a cylindrical bearing block, a jockey-wheel journalled upon said bearing block, a supporting member for the bearing block extending on both sides thereof, a bearing pin extending through a hole in the bearing block near its periphery and supported at both ends in the supporting member, a spring adapted to urge the bearing block to rotate about the bearing pin, a ratchet segment carried by the supporting member, a plurality of spring-pressed pawls mounted side by side in the bearing block and formed with notches in their sides, the teeth-engaging faces of the pawls being spaced apart along the length of the ratchet segment, and a cylindrical member housed in the supporting member and having a projection engaging said notches, one end of the cylindrical member being accessible externally and formed with a transverse slot.

2. An automatic tensioning device comprising in combination a cylindrical bearing block, a jockey wheel journalled upon said bearing block, a supporting member for the bearing block comprising a back-plate, a spigot rigid therewith extending through a clearance aperture in the bearing block and a front-plate detachably secured to the front end of the spigot, a bearing pin extending through a hole in the bearing block near its periphery and supported at its ends in holes in the back-plate and the front-plate of the supporting member, a spring adapted to urge the bearing block to rotate about a bearing pin and means for preventing rotation of the bearing block in the direction to stress the spring while permitting it to rotate in the direction to relieve the spring.

3. The invention of claim 2 wherein the spigot forming part of the supporting member has an arcuate surface concentric with the bearing pin and formed with ratchet teeth for cooperation with a pawl carried by the bearing block.

ALFRED RENSHAW.